United States Patent
Stenson et al.

(10) Patent No.: US 10,255,650 B2
(45) Date of Patent: Apr. 9, 2019

(54) GRAPHICS PROCESSING USING DYNAMIC RESOURCES

(71) Applicant: Sony Interactive Entertainment Inc., Tokyo (JP)

(72) Inventors: Richard B. Stenson, San Mateo, CA (US); Steven Osman, San Francisco, CA (US); Jun Murakawa, Foster City, CA (US); Christopher Ho, Belmont, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 441 days.

(21) Appl. No.: 13/902,661

(22) Filed: May 24, 2013

(65) Prior Publication Data
US 2014/0347371 A1    Nov. 27, 2014

(51) Int. Cl.
*G06T 1/20* (2006.01)

(52) U.S. Cl.
CPC ...................... *G06T 1/20* (2013.01)

(58) Field of Classification Search
CPC ............... G06T 1/20; G06F 17/30616; G06Q 10/06311; G06Q 10/10
See application file for complete search history.

(56) References Cited

U.S. PATENT DOCUMENTS

| | | | |
|---|---|---|---|
| 7,944,450 B2 | 5/2011 | Bakalash et al. | |
| 8,044,951 B1 | 10/2011 | Brown et al. | |
| 8,134,566 B1 | 3/2012 | Brown et al. | |
| 8,963,918 B2 * | 2/2015 | Zhou et al. | 345/420 |
| 2006/0109270 A1 * | 5/2006 | Perey et al. | 345/427 |
| 2007/0076010 A1 | 4/2007 | Swamy et al. | |
| 2007/0220525 A1 | 9/2007 | State et al. | |
| 2008/0246773 A1 * | 10/2008 | Jiao et al. | 345/522 |
| 2009/0141034 A1 | 6/2009 | Pryor et al. | |
| 2009/0217252 A1 | 8/2009 | Aronson et al. | |
| 2009/0322751 A1 | 12/2009 | Oneppo et al. | |
| 2010/0110083 A1 | 5/2010 | Paltashev et al. | |
| 2010/0122264 A1 * | 5/2010 | Xiaocheng | G06F 9/544 719/312 |
| 2010/0328327 A1 | 12/2010 | Hervas | |
| 2011/0113011 A1 | 5/2011 | Prorock et al. | |
| 2011/0242117 A1 | 10/2011 | Bolz et al. | |
| 2011/0242125 A1 | 10/2011 | Hall et al. | |
| 2013/0021353 A1 * | 1/2013 | Drebin et al. | 345/522 |

(Continued)

OTHER PUBLICATIONS

Kyriazis, George. "Heterogeneous system architecture: A technical review." AMD Fusion Developer Summit (2012).*

(Continued)

*Primary Examiner* — Phi Hoang
(74) *Attorney, Agent, or Firm* — JDI Patent; Joshua D. Isenberg; Robert Pullman

(57) ABSTRACT

A system has a central processing unit (CPU) and a graphics processing unit (GPU) that includes one or more registers. The GPU can change a resource descriptor in one of the GPU's registers. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

26 Claims, 4 Drawing Sheets

(56) References Cited

U.S. PATENT DOCUMENTS

| | | | |
|---|---|---|---|
| 2013/0265309 A1* | 10/2013 | Goel | G06T 15/80 |
| | | | 345/426 |
| 2014/0281364 A1* | 9/2014 | Buschardt | G06F 12/1009 |
| | | | 711/207 |
| 2014/0347371 A1 | 11/2014 | Stenson et al. | |
| 2014/0347375 A1 | 11/2014 | Stenson et al. | |
| 2014/0362093 A1 | 12/2014 | Lorach | |

OTHER PUBLICATIONS

Bentley Jon L. Multidimensional Binary Search Trees in Database Applications IEEE Ttransactionson Software Engineering,vol. SE-5, No. 4, Jul. 1979,par, I "Introduction".

International Search Report and Written Opinion for International Application No. PCT/2014/039430, dated Nov. 6, 2014.

International Search Report and Written Opinion for International Application No. PCT/US2014/039436, dated Oct. 16, 2014.

Marks Michal et al. Heterogeneou GPU&CPU cluster for high performance computing in cryptography Computer Science 13(2) 2012, par. 5 "Parallel implementation of cryptography and cryptanalysis" par, 5,1. "Cryptography and cryptanalysis on GPU", par.5 .2. "Numerical results in HGCC".

Nathan A. Carr et al. The Ray Engine. Graphics Hardware, 2002,par,3 "Ray Tracing with the GPU", par.3.1. "Ray Casting".

Non-Final Office Action for U.S. Appl. No. 13/902,658, dated Aug. 11, 2015.

Final Office Action for U.S. Appl. No. 13/902,658, dated Feb. 25, 2016.

Notice of Allowance for U.S. Appl. No. 13/902,658, dated Jul. 13, 2016.

* cited by examiner

GRAPHICS PROCESSING USING DYNAMIC RESOURCES

FIELD OF THE INVENTION

Aspects of the present disclosure are related to computer graphics. In particular, the present disclosure is related to dynamic creation of resources by a graphics processor unit.

BACKGROUND

Computer graphics are graphics created using computers and a representation of image data. Computer graphics are typically implemented with specialized graphic hardware and software. Such hardware and software can be implemented on general purpose computers or special purpose devices, including smartphones, tablet computers, gaming consoles and portable game devices. Computer graphic development has had a significant impact on many types of media and has revolutionized animation, movies and the video game industry.

Computer graphics may involve encoding information about shapes and colors of objects that make up an image. This can allow for great flexibility in rendering the objects. Some computer graphics systems can generate animations by performing computations on data representing the objects to simulate movement of the objects. Such computations may involve simulating physical interactions that control the movement of the objects. Such simulation may compute the locations of points on each object (sometimes called vertices) may be computed in three dimensions for each frame of animation. Then the objects may be rendered as a two dimensional image.

Modern computer graphics often involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

Often, the physics simulations are performed on the CPU and rendering of the images are performed on the GPU. In some computer graphics systems certain re-processing of data is performed on the CPU to set up work for work to be run on the GPU. This may involve, e.g., setting up buffers of data and configuration parameters for rendering programs (sometimes called shaders) that run on the GPU.

Graphics processing units have become increasingly more powerful, with processing capabilities often rivaling or even exceeding those of the CPU.

It is within this context that aspects of the present disclosure arise.

SUMMARY

According to aspects of the present disclosure, graphics processing method may be implemented in a system having a central processing unit (CPU) and a graphics processing unit (GPU) having one or more registers. The method uses the GPU to change a resource descriptor in one or more of the GPU's registers.

In some implementations using the GPU to change a resource descriptor may include creating the resource descriptor with the GPU.

In some implementations using the GPU to change a resource descriptor includes changing a value of a pointer in the resource descriptor with the GPU.

In some implementations using the GPU to change a resource descriptor may include walking a binary tree with the GPU. The binary tree may be a k-d tree. Using the GPU to change a resource descriptor may include performing ray tracing with the GPU.

In some implementations using the GPU to change a resource descriptor may include tracing a linked list with the GPU.

In some implementations using the GPU to change a resource descriptor may include sorting data with the GPU.

In some implementations using the GPU to change a resource descriptor may include performing a hash function on data with the GPU.

In some implementations, the CPU and GPU may share a unified memory.

In some implementations using the CPU to make a portion of the unified memory accessible to the GPU may include providing a pointer to the resource descriptor.

In some implementations using the CPU to make a portion of the unified memory accessible to the GPU may include providing the GPU with access to all of the unified memory.

In some implementations using the CPU to make a portion of the unified memory accessible to the GPU may include providing a pointer to the resource descriptor and providing the GPU with access to all of the unified memory.

In some implementations, the method may further comprise using the GPU to allocate for use by the GPU at least part of the portion of the unified memory accessible to the GPU.

In some implementations, the resource descriptor may include information identifying a data type for a corresponding resource in the unified memory.

In some implementations, the resource descriptor may include information identifying a size of data for a corresponding resource in the unified memory.

In some implementations, the resource descriptor may include a pointer to data in memory that corresponds to the resource.

According to additional aspects of the present disclosure, a computer graphics system may include a central processing unit (CPU) and a graphics processing unit (GPU) having one or more registers, and a unified memory shared by the CPU and the GPU. The graphics processing system is configured to use the GPU to change a resource descriptor in one or more of the GPU's registers.

According to further aspects of the present disclosure, a non-transitory computer readable medium may have embodied therein computer readable instructions configured to implement a computer graphics method in a system having a central processing unit (CPU) and a graphics processing unit (GPU) having one or more registers. The method may include using the GPU to change a resource descriptor in one or more of GPU's registers.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Conventionally, to run a shader on the GPU the shader needs resources that have been set up by the CPU. With many modern GPU architectures shader resource setup involves considerable CPU overhead and therefore carries a considerable performance cost. Aspects of the present disclosure bypass this traditional CPU shader overhead by removing unneeded CPU interactions, unneeded memory loads, memory duplication, bookkeeping, and not needing to even predefine any shader resources before shader execution by the GPU. Also on the GPU side the resources and their respective descriptions take up less memory and require less manipulation before being used by the respective draw call. This feature is key for enabling GPU Shaders to behave almost completely like CPUs in that they can dynamically create and manage their own resources with little or no CPU assistance, thus unlocking more potential performance in the conventional sense, but also in the enabling GPU shaders to handle tasks traditionally only effectively processed on the CPUs.

In many modern graphics processors the computational capabilities of the GPU often exceed those of the CPU. By way of example, and not by way of limitation, suppose the CPU has 8 cores, each of which can run one thread at a time. Further suppose that the GPU has 18 cores and each core can run 64 threads at a time. In this example, the GPU can execute 18×64=1152 threads at one time as opposed to 8 threads on the CPU (one per core on an 8-core CPU). Threads can spawn new thread. According to aspects of the present disclosure, developers can write allocators for the GPU and thereby unlock the processing capability of the GPU. This tremendous processing capability could be used to implement pre-graphics processing such as generation of corners, vertex transmutations, visibility culling, and elimination of vertex triangles that would smaller than one pixel when rendered.

Figure 1A:
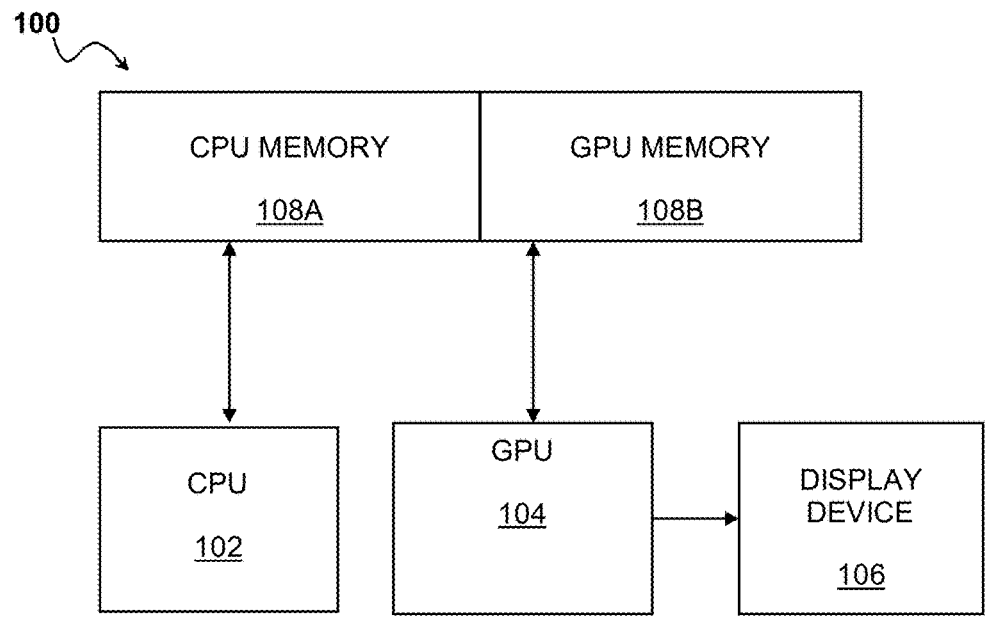
FIGS. 1A-1B are block diagrams of conventional graphics processing systems.
Figure 1B:
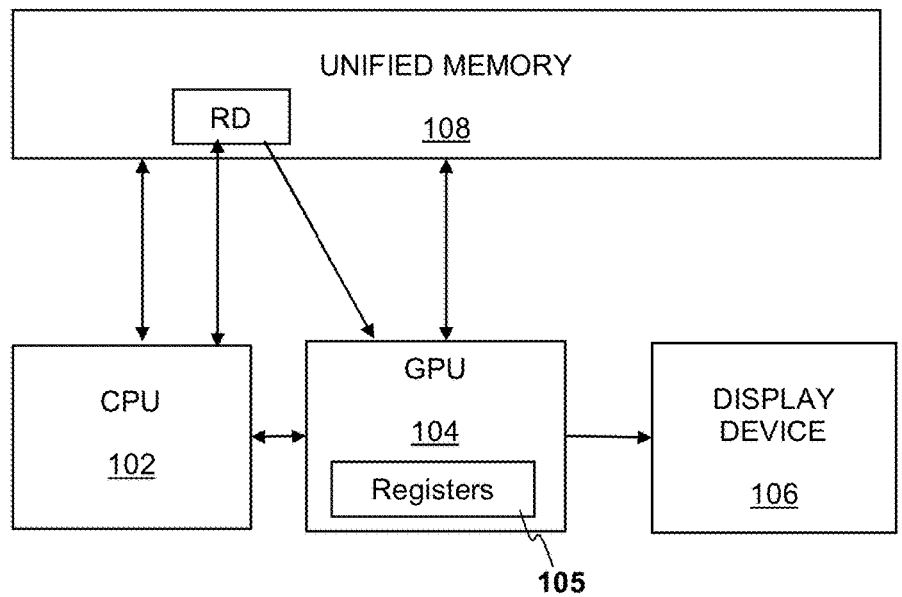

Unfortunately, access to such processing capability is restricted by current graphics processing system architectures. The problem is illustrated by FIG. 1A and FIG. 1B. As seen in FIG. 1A, a conventional graphics processing system 100 includes a CPU 102, GPU 104, display device 106 and a memory 108. In many graphics architectures, the memory 108 is divided into separate memories 108A, 108B, for the CPU 102 and GPU 104 respectively. Data must be copied from one memory to the other. For example, suppose the CPU 102 performs computations on data (e.g., transmutation of vertices) and the result of the computations is to be sent to the GPU 104 for further processing (e.g., shading). In a conventional system, the CPU would have to output the result of the computations to CPU memory 108A and then copy the result to GPU memory 108B. If the CPU 102 needs to access the result of computations performed by the GPU 104, the data must be copied from the GPU memory 108B to the CPU memory 108A.

Recently, graphics processing systems have been developed with heterogeneous unified memory access, as shown in FIG. 1B. In this type of graphics processing architecture, the CPU 102 and GPU 104 share a unified memory 108. The CPU 102 can save the output of its computations to the unified memory 108 and then provide the GPU 104 with a pointer to the unified memory location of the results. However, in conventional heterogeneous memory access systems, the CPU 102 has to tell the GPU 104 which region to access and which bus to use to access the data. Currently, only the CPU 102 can allocate blocks of memory for use by the GPU 104.

To access the unified memory 108, a shader run by the GPU 104 needs a resource descriptor RD, which describes data for a resource to be used by the shader. Resources that can be used by a shader may include, but are not limited to buffers of data, such as colors, textures, vertex buffers, and the like, pointers to other resource tables, as well as uniform constants that are uniform across a draw call. By way of example, and not by way of limitation, the resource descriptor RD may include information identifying a data type for each resource (e.g., whether the data is a texture, integer number, floating point number, character string, etc.), a size of the corresponding data (e.g., height and width for a texture, number of bytes in a number or string, etc.) and a pointer to a location in the unified memory 108 of the corresponding data.

If a shader run by the GPU 104 can generate its own new resources the GPU can behave like a CPU. However, in previous implementations of heterogeneous unified memory access, resource descriptors RD for the GPU 104 are read-only, as indicated by the single ended arrow between the GPU and the resource descriptor. In other words the GPU 104 can read the resource descriptors but cannot change or generate them. Only the CPU 102 could generate or change a resource descriptor RD because there was simply no mechanism for the GPU to change these descriptors.

Although existing graphics processing architectures that use heterogeneous unified memory architecture allow the GPU 104 to access the unified memory 108, they generally do not allow the GPU to change resources. Instead, the GPU has access to resource descriptors RD, which were read-only. Although the GPU 104 could access the descriptors in the unified memory 108, it could not change them on the fly. Nor can the GPU 104 create or change resource descriptors and load them directly to the GPU's registers 105. As a result, the processing power of the GPU is locked up and limited by the CPU overhead required to set up the resource descriptors RD.

According to aspects of the present disclosure the CPU 102 can be configured to make a relevant part of unified memory accessible to the GPU 104 and the GPU can be configured to access that part of memory in a way that permits the GPU to change resource descriptors RD. According to aspects of the present disclosure, the GPU can also allocate blocks of memory for GPU tasks within the space allocated by the CPU once the CPU makes the corresponding memory space available to the GPU. This allows the GPU to work on smaller portions of data that can be determined by the GPU at runtime for the greatest flexibility. Without the ability for the GPU to create resource descriptors on-the-fly, the CPU would have to perform these tasks or set up the resource descriptors for these tasks.

To implement such features, a certain amount of cross-compilation of resource descriptors between the CPU and GPU is desirable. In addition, the GPU compiler 106 should be configured to implement resource initialization with the GPU so that the GPU can create resource descriptors directly in GPU registers. By implementing such features the GPU can create and modify resource descriptors in GPU registers avoiding extra maintenance for these resource descriptors and the time used in copying such descriptors to and from memory as well.

Cross-Compilation Between CPU and GPU

In a typical graphics processing system a software component, referred to herein as a constant update engine (CUE), is implemented by the CPU 102 to perform set up work for GPU shaders to run on the GPU 104. The CPU 102 runs a GPU compiler that converts GPU source code into GPU object code that is executable by the GPU 104 so that instructions embodied in the code can be implemented by the shaders. The GPU compiler includes a front end that translates the instructions from the GPU source code, which may be in a particular shading language used by the system, into an intermediate language. A back end of the compiler then translates the instructions from the intermediate language into the GPU object code that is executable by the GPU, which may be machine code.

One drawback with such a setup is that the layout of resources for the GPU programs is dictated by the back end of the compiler in a way that may be inefficient. Because the back end of the compiler dictates the data layout and setup of shader resources, developers of applications to be implemented by the CPU and having graphics rendered by a GPU 104 have little control over how shader resources are managed. Accordingly, there may be little data re-use between draw calls, and the constant management and copying of resource tables by the CUE of the CPU 102 between each draw call slows down performance of the system. Moreover, the large amount of overhead and bookkeeping associated with this constant CPU-GPU interaction can create a bottleneck and prevent the system from fully utilizing the GPU's processing power.

The CPU overhead is partly a result of the way graphics processing systems handle memory access from a graphics pipeline. Conventional graphics processing systems typically handle such memory access through a set of named access points. Portions of the graphics pipeline refer to these access points by name, and the application binds memory resources to each name through the API. The access points act as an indirection, decoupling shaders and pipeline configurations from specific memory resources and their properties. However, the CPU 102 (specifically, the CUE) must still keep track of the memory locations of these resources.

Some graphics processing systems attempt to address this so-called "bindless" memory access that allows a developer to set a pointer to a portion of a data layout, e.g., a particular resource definition. However, even in such systems the developer has no control over the design of the data layout, which is dictated by part of the GPU compiler.

Figure 1C:
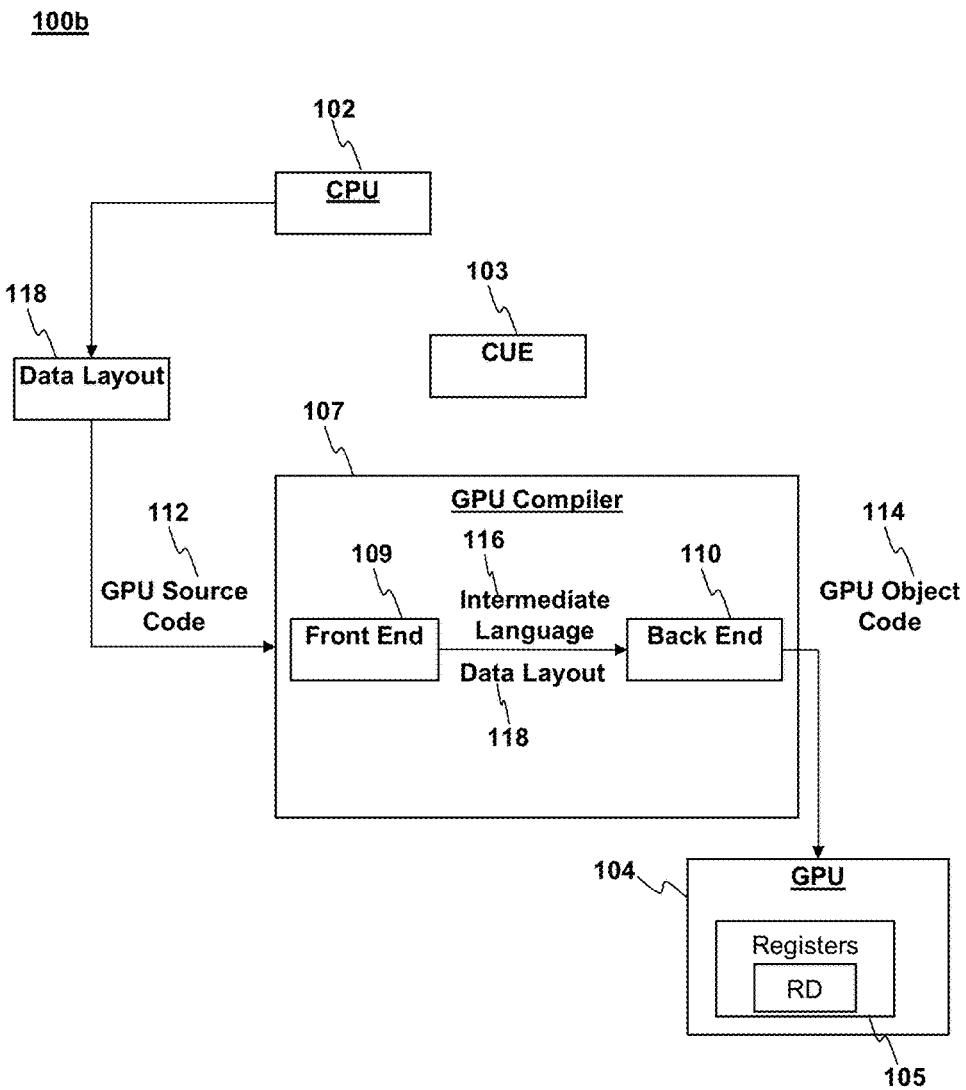
FIG. 1C depicts compilation for graphics processing according to an aspect of the present disclosure.

FIG. 1C illustrates cross-compilation according to aspects of the present disclosure. In the illustrated implementation, a GPU compiler 107 is configured to accept a layout 118 of shader resources dictated to it in the source code 112, which a front end 109 of the compiler translates into intermediate language instructions. In order to enable the compiler 107 to accept the data layout 118, the shading language of the source code 112 includes language constructs that allow the back end 110 of the compiler to accept a pre-defined data layout that can be used to translate the intermediate language instructions 116 into GPU object code 114.

The shading language of the GPU code may include constructs that allow developers to include instructions in the source code 112 that define a layout fed into the compiler 107. Developers may define the data layout in the form of one or more shader resource tables included in the shading language instructions for a particular application to be run on the system. Likewise, the intermediate language 116 includes the ability to define the layout 118 in order to dictate to the back end of the compiler a data layout that is utilized by shaders of the GPU 104 executing object code 114. Accordingly, in the illustrated implementation, a developer of an application to be implemented by the processors can define the layout 118 in a manner that efficiently organizes the data and maximizes reuse of data between draw calls.

Resources used by the shaders may include buffers of data, such as colors, textures, vertex buffers, and the like, pointers to other resource tables, as well as uniform constants that are uniform across a draw call. Developers of applications running on the system have the best knowledge of how to optimize the layout of data for their particular case. Accordingly, developers, i.e. creators of the programs for the particular application running on the system that includes graphics, can define the data layout through shader resource tables that define a data layout for their particular case.

For example, developers have knowledge of what data between calls changes frequently and what data changes infrequently. Certain data may be constant for a particular frame of a graphic, or even for an entire application. Aspects of the present disclosure allow a developer to define shader resource tables that configure the data layout of resources utilized by the GPU shaders. Moreover, the method can bypass the CUE 103 when implementing a draw call because the layout of shader resources utilized by the GPU programs is already pre-defined in the instructions of the shading language. This can improve performance by avoiding overhead associated with the constant updating and copying of entire resource tables each time a texture changes between draw calls. In some implementations, a CUE 103 may still be utilized to manage some data. In yet further implementations, the CUE 103 may be bypassed completely.

The shader language may include operators (e.g., "->") that implement pointers to locations in memory. In one implementation, the shading language constructs include cross-compilable resource descriptors (definitions of shader resources) that are executable or shareable by both the CPU 102 and GPU 104. In particular, these shading language constructs may be cross-compiled between the graphics API which is run on the CPU and the GPU shader language that is run on the GPU.

It is noted that shading languages do not normally have such pointers. By way of example, and not by way of limitation, cross-compilable resource descriptors may be implemented as a header incorporated into the shading language that includes the developer-defined layout of resources in the form of one or more shader resource tables. The shading language may be mimicked in the CPU language allowing a developer to set up resources and coordinate corresponding CPU and GPU data layout easily when creating programs for a particular application. For example, any change to the data layout that the programmer makes during creation of an application can be made on both the CPU and GPU sides with the same change to the cross-compilable definition, thereby greatly facilitating the programming process and ensuring consistency.

By way of example, and not by way of limitation, the following illustrative code can be incorporated in the graphics instructions of the shader language. In the following example, the shader on a GPU 104 can use a layout in the form of a resource table having a configuration that is set up by a programmer through the CPU 102. Further details and examples of such cross-compilation are described in commonly-assigned U.S. patent application Ser. No. 13/902,652, entitled DEVELOPER CONTROLLED LAYOUT, filed the same date as the present application.

GPU Initialization Functions

In addition to shader language extensions that allow for cross-compilation between the CPU 102 and GPU 104 the GPU compiler 106 may be further configured to include initiation functions in the shader language that allow the GPU 104 to create resource descriptors. Resource types and initialization structures (e.g., texture types and texture initialization structures) can be ported to the shader language. Because initialization functions work in the shader, the GPU 104 can change resource descriptors in addition to using resource descriptors specify shade resource layouts.

To implement initialization functions in the shader language run by the GPU 104 the compiler backend 110 may include instructions that enable the GPU to load resources (e.g., textures) with resource descriptors specified in a string of GPU registers 105 (e.g., 4-8 for textures depending on the type of resource descriptor). With these instructions, the GPU may load resource descriptors directly into the GPU registers 105. The descriptors do not need to be predetermined by the initial GPU compiler output.

Method

Figure 2:
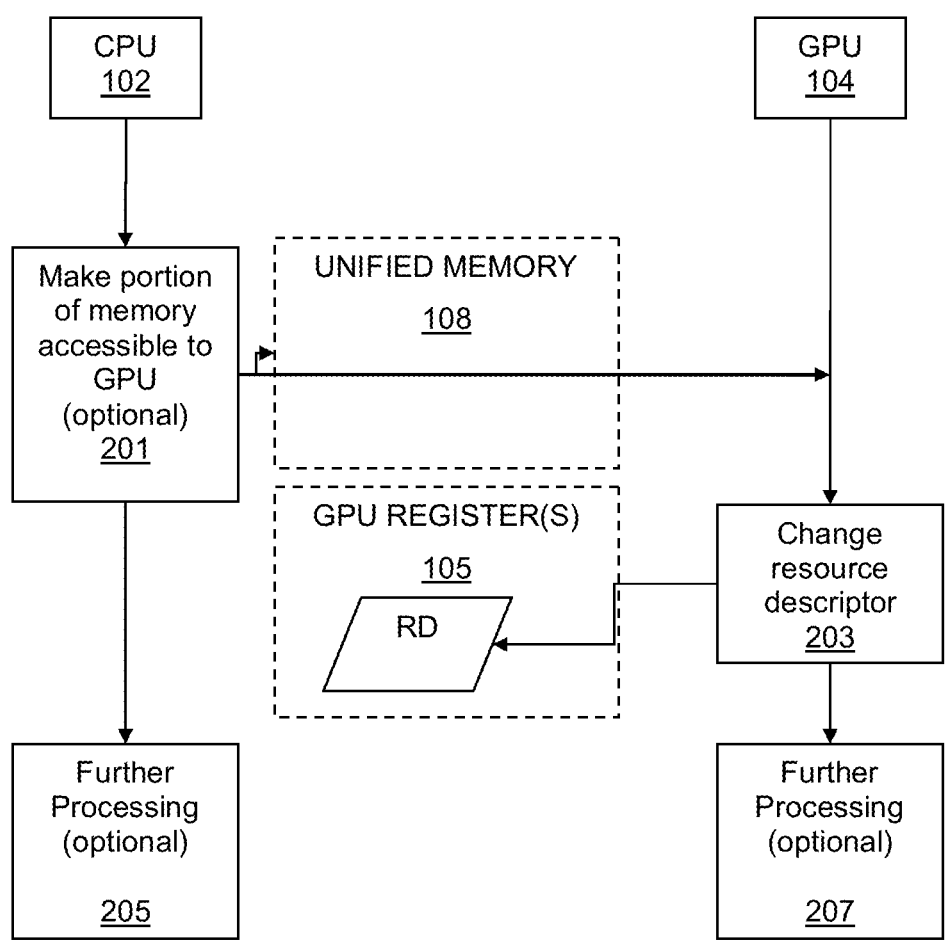
FIG. 2 is a block diagram of a graphics processing method according to an aspect of the present disclosure.

FIG. 2 illustrates an example of a possible process flow in a computer graphics processing method 200 according to an aspect of the present disclosure. The method 200 may be implemented with a graphics processing system having an architecture of the type shown in FIG. 1B. In general, the CPU 102 may optionally make a portion of the unified memory 108 accessible to the GPU 104, as indicated at 201. Making a portion of the unified memory accessible to the GPU allows the GPU to do its own memory allocation.

By way of example, and not by way of limitation, the CPU 102 may provide information to the GPU 104 identifying which portion of the unified memory 108 is available to the GPU 104. Such information may identify, e.g., a range of memory addresses, which may include up to all of the unified memory). The information may also include a pointer to a resource descriptor RD in the unified memory 108. By way of example, and not by way of limitation, the CPU 102 may provide a pointer to the resource descriptor and providing the GPU 104 with access to all of the unified memory 108. In cases where the CPU 102 and GPU 104 can access the memory by two or more data busses, the information may further specify which data bus the GPU 104 can use to access the unified memory 108.

The GPU may then change a resource descriptor RD in one or more of the GPU's registers 105, as indicated at 203. The CPU 102 may optionally perform further processing, as indicated at 205. Likewise, the GPU 104 may optionally perform further processing, as indicated at 207.

By way of example, and not by way of limitation, the GPU 104 may change the resource descriptor RD by creating the resource descriptor. If the GPU 104 can do its own memory allocation, the GPU can create resource descriptors in its own registers, i.e., with no external memory load. If the GPU can create resource descriptors in its own registers it can also make the modifications to the descriptors in the registers. This is significant because, typically, a GPU shader resource descriptor is relatively wide, so GPU registers are correspondingly wide or shader resource descriptors take up multiple consecutive GPU registers. By way of example, in some systems a GPU resource descriptor may be, e.g., 4-8D words (128-256 bits) and a GPU scalar register may be 1D word (32 bits). By way of example, in such a case an 8D word shader resource descriptor would take up consecutive 8 GPU registers.

By way of alternative example, the GPU may change the resource descriptor RD by changing a value of a pointer in the resource descriptor.

By making the GPU able to change a resource descriptor, the processing potential of the GPU 104 can be unlocked. The ability to change resource descriptors allows the GPU 104 to perform a number of functions previously performed only by the CPU. By way of example, and not by way of limitation, aspects of the present disclosure allow the GPU 104 to create and manipulate tree data structures trace link lists, perform sorting, or perform hashing with minimal CPU interaction. Some examples of such functions are described below.

Tree Data Structures

A tree data structure can be defined as a collection of nodes (starting at a root node), where each node is a data structure consisting of a value, together with a list of references (e.g., pointers) to other nodes (referred to as "children"), with the constraints that no reference is duplicated, and none points to the root. Stepping through the items of a tree, by means of the connections between parents and children, is commonly referred to as walking the tree, and the action is sometimes called a walk of the tree. Walking a tree involves changing the references. If the GPU 104 can change resource descriptors according to aspects of the present disclosure the GPU can change the references in a tree structure and walk the tree.

Tree structures include binary trees, in which each node has at most two child nodes. One particularly useful type of binary tree is known as a k-d tree. Informally, a k-d tree may be described as a binary tree in which every node is a k-dimensional point. Binary trees are used to implement binary search trees and binary heaps, which may be applied to efficient searching and sorting algorithms.

Tree structures have many applications. By way of example, and not by way of limitation, ray tracing algorithms often make use of a k-d tree to define where objects are in a scene so that a ray of light can be followed. For ray tracking in animated graphics the tree needs to be rebuilt once an object moves. Generally, the CPU 102 keeps track of where things are in the scene. According to aspects of the present disclosure, the CPU 102 can give the GPU 104 a pointer to memory and provides the GPU with access to all of unified memory. GPU may have multiple cores that can now access the unified memory 108 and change resources. If GPU can allocate and de-allocate memory it can change pointers and look where they need to look to be able to reinterpret the relevant part of the tree. The GPU functionality unlocked by aspects of the present disclosure allows the GPU to re-Interpret k-d trees for ray tracing, or walk binary trees or walk trees of any kind with minimal interaction by the CPU 104.

Linked Lists

A linked list is a data structure involving a group of nodes that collectively represent a sequence. Under the simplest form, each node is composed of a datum and a reference (in other words, a link) to the next node in the sequence; more complex variants add additional links. This structure allows for efficient insertion or removal of elements from any position in the sequence.

In a typical graphics processing system, a GPU 104 can read the data at each node and follow the pointer to the next node but the GPU could not create a new resource descriptor that uses the pointer and includes as its datum a pointer to some location in unified memory 108 that contains relevant data.

It is currently impossible for a GPU to do a linked list because in order to do a linked list the processor needs to change resource descriptors. As discussed above, conventional graphics processing systems, even those that use heterogeneous unified memory access, the GPU 104 could not change resource descriptors RD because they are read-only. According to aspects of the present disclosure, the GPU 104 can change resource descriptors. Therefore, the GPU 104 can create, modify, or trace a linked list.

Hash Functions

A hash function is an algorithm or subroutine that maps data sets of variable length to data sets of a fixed length. For example, a person's name, having a variable length, could be hashed to a single integer. The values returned by a hash function are called hash values, hash codes, hash sums, checksums or simply hashes. Hash functions represent one-way algorithms with a predefined size. Hash functions are commonly used to accelerate table lookup or data comparison tasks such as finding items in a database. In computer graphics, geometric hashing is often used to efficiently find two-dimensional objects represented by discrete points that have undergone an affine transformation (i.e., one in which points initially lying on a line still like on the line after the transformation).

Implementing hash functions on a CPU is well known. However, implementing such functions on a GPU was previously not possible because the GPU could not change a resource descriptor. According to aspects of the present disclosure, the GPU 104 can change resource descriptors. Therefore, the GPU 104 can perform hash functions on data stored in the unified memory 108.

Sorting

As discussed above, sorting data may involve binary trees. Sorting data requires the ability to change resource descriptors or allocate or de-allocate memory. According to aspects of the present disclosure, the GPU 104 can change resource descriptors. Therefore, the GPU 104 can perform sorting on data stored in the unified memory 108.

System

Figure 3:
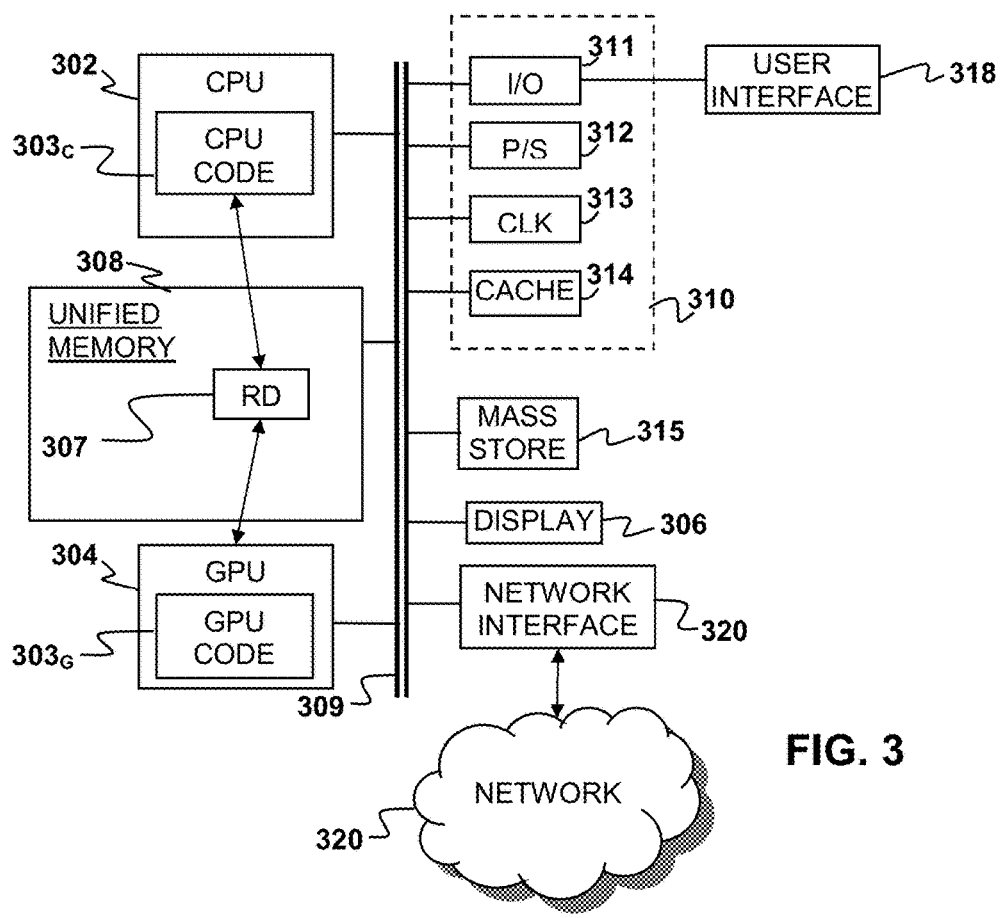
FIG. 3 is a block diagram of a graphics processing system according to an aspect of the present disclosure.

Aspects of the present disclosure include systems configured to implement computer graphics processing, as described above. By way of example, and not by way of limitation, FIG. 3 illustrates a block diagram of a computer system 300 that may be used to implement video coding according to aspects of the present disclosure. The system 300 generally may include a central processor unit (CPU) 302, a graphics processor unit (GPU) 304, and a unified memory 308 that is accessible to both the CPU and GPU. The CPU 302 and GPU 304 may each include one or more processor cores, e.g., a single core, two cores, four cores, eight cores, or more. The unified memory 308 may be in the form of an integrated circuit that provides addressable memory, e.g., RAM, DRAM, and the like. The system 300 may be configured to implement heterogeneous unified memory access (hUMA), as discussed above.

The CPU 302 and GPU 304 may access the unified memory 308 using a data bus 309. In some cases, it may be useful for the system 300 to include two or more different buses. For example one bus may be characterized by a high bandwidth but also a high latency. Another bus may be characterized by a lower latency but also a lower bandwidth. It may be impractical (or too expensive) to implement a high latency, low bandwidth bus. In such a case, the system could use the high bandwidth, high latency bus in situations where the high bandwidth is more important, e.g., where a large amount of data is to be transferred to or from memory in one data transfer operation. The low bandwidth, low latency bus may be more useful in other situations where low latency is more important, e.g., where smaller amounts of data must be transferred to or from memory in a large number of separate data transfer operations. According to certain aspects of the present disclosure the bus(es) 309 may include a high latency, high bandwidth bus. In allocating memory to the GPU 304 the CPU 302 may direct the GPU to access the allocated part of memory via the high bandwidth, high latency bus.

The unified memory 308 may contain data that can be accessed by the CPU 302 and GPU 304. Such data may include one or more resource descriptors 307. As discussed above, each resource descriptor 307 may include information identifying a data type for each resource (e.g., whether the data is a texture, integer number, floating point number, character string, etc.), a size of the corresponding data (e.g., height and width for a texture, number of bytes in a number or string, etc.) and a pointer to a location in the unified memory 308 of the corresponding data.

Programs may also be stored in the memory 308 in the form of CPU code $303_C$ that can be executed by the CPU 302 or GPU code $303_G$ that can be executed the GPU 304. The CPU 302 may temporarily store part of its code $303_C$ or data in registers. Likewise, the GPU 304 may temporarily store part of its code $303_G$ in registers. The CPU code $303_C$ and GPU code $303_G$ may be configured to implement a computer graphics method of the type described above with respect to FIG. 2. In particular, the CPU code $303_C$ may include a GPU compiler, which may be configured as discussed above. In some implementations the CPU code $303_C$ may optionally include one or more instructions that, when executed, make a portion of the unified memory 308 accessible to the GPU 304. Such instructions may inform the GPU 304 of which portion of the memory 308 is available. (e.g., a range of memory addresses, which may include up to the whole of the unified memory). In cases where there are two or more data busses 309, the instructions may further specify which data bus the GPU 304 can use to access the unified memory 308.

The GPU code $303_G$ may include one or more instructions that, when executed by the GPU 304, change a resource descriptor in the portion of the unified memory accessible to the GPU. The code $303_C$, $303_G$ may be in any suitable processor readable language, e.g., a higher level language such as C, C++, JAVA, and intermediate level language such as Assembly, or machine readable code depending on the nature of the CPU and GPU. The CPU code $303_C$ and GPU code $303_G$ may be stored in a non-transitory computer readable medium, e.g., a computer memory or mass storage device in a form that is readable (or even executable) by the CPU 302 or GPU 304.

The system 300 may also include well-known support functions 310, which may communicate with other components of the system, e.g., via the bus 309. Such support functions may include, but are not limited to, input/output (I/O) elements 311, power supplies (P/S) 312, a clock (CLK) 313 and cache 314. The apparatus 300 may optionally include a mass storage device 315 such as a disk drive, CD-ROM drive, flash memory, tape drive, or the like to store programs and/or data. The device 300 may also optionally include a display unit 306 and user interface unit 318 to facilitate interaction between the apparatus 300 and a user. The display unit 306 may be in the form of a flat panel display, cathode ray tube (CRT) screen or other device that can display text, numerals, graphical symbols or images. The user interface 318 may include a keyboard, mouse, joystick, light pen, game controller, or other device that may be used in conjunction with a graphical user interface (GUI). The system 300 may also include a network interface 320 to enable the device to communicate with other devices over a network 322. The network 322 may be, e.g., a local area network (LAN), a wide area network such as the internet, a personal area network, such as a Bluetooth network or other type of network. These components may be implemented in hardware, software, or firmware, or some combination of two or more of these.

Aspects of the present disclosure enable GPU hardware to create shader resources descriptors, or SRDs, on the fly in shader registers within a GPU shader. Allowing the GPU to change or create resource descriptors allows the GPU to perform a great variety of processing tasks that were traditionally only performed by the CPU.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a system having a central processing unit (CPU) and a graphics processing unit (GPU) having one or more registers:
   performing a method comprising using the GPU to create a resource descriptor stored in one or more of the GPU's registers wherein the resource descriptor describes a shader resource that is used during a draw call of the GPU and wherein the result of the draw call is displayed on a display device.

2. The method of claim 1, wherein the CPU and GPU share a unified memory.

3. The method of claim 2, further comprising using the CPU to make a portion of the unified memory accessible to the GPU, wherein said portion would otherwise be inaccessible by the GPU.

4. The method of claim 3, wherein using the CPU to make a portion of the unified memory accessible to the GPU includes providing a pointer to the resource descriptor.

5. The method of claim 3, wherein using the CPU to make a portion of the unified memory accessible to the GPU includes providing the GPU with access to all of the unified memory.

6. The method of claim 3, wherein using the CPU to make a portion of the unified memory accessible to the GPU includes providing a pointer to the resource descriptor and providing the GPU with access to all of the unified memory.

7. The method of claim 2, further comprising using the GPU to allocate for use by the GPU at least part of the portion of the unified memory accessible to the GPU, wherein said portion would otherwise be inaccessible by the GPU.

8. The method of claim 1, wherein the resource descriptor includes information identifying a data type for a corresponding resource in the unified memory.

9. The method of claim 1, wherein the resource descriptor includes information identifying a size of data for a corresponding resource in the unified memory.

10. The method of claim 1, wherein the resource descriptor includes a pointer to data in memory that corresponds to the resource.

11. The method of claim 1, further comprising using the GPU to change the resource descriptor.

12. The method of claim 11, wherein using the GPU to change a resource descriptor includes using a cross-compiled resource descriptor that is cross-complied between the CPU and the GPU, wherein the cross-compiled resource descriptor is executable by both the CPU and GPU.

13. The method of claim 11, wherein using the GPU to change a resource descriptor includes using the GPU to load resources with resource descriptors specified in one or more of the GPU's registers.

14. The method of claim 11, wherein using the GPU to change a resource descriptor includes creating the resource descriptor with the GPU.

15. The method of claim 11, wherein using the GPU to change a resource descriptor includes changing a value of a pointer in the resource descriptor with the GPU.

16. The method of claim 11, wherein using the GPU to change a resource descriptor includes walking a binary tree with the GPU.

17. The method of claim 16, wherein the binary tree is a k-d tree.

18. The method of claim 16, wherein using the GPU to change a resource descriptor includes performing ray tracing with the GPU.

19. The method of claim 11, wherein using the GPU to change a resource descriptor includes tracing a linked list with the GPU.

20. The method of claim 11, wherein using the GPU to change a resource descriptor includes sorting data with the GPU.

21. The method of claim 11, wherein using the GPU to change a resource descriptor includes performing a hash function on data with the GPU.

22. A computer graphics system, comprising:
    a central processing unit (CPU);
    a graphics processing unit (GPU) having one or more registers;
    a unified memory shared by the CPU and the GPU;
    wherein the graphics processing system is configured to use the GPU to create a resource descriptor stored in one or more of the GPU's registers, wherein the resource descriptor describes a shader resource that is used during a draw call of the GPU and wherein the result of the draw call is displayed on a display device.

23. The system of claim 22, wherein the CPU includes a GPU compiler configured to implement cross-compilation of resource descriptors between the CPU and GPU to generate one or more cross-compiled resource descriptors executable by both the CPU and GPU.

24. The system of claim 23, wherein the GPU compiler includes instructions that enable the GPU to load resources with resource descriptors specified in one or more of the GPU's registers.

25. The system of claim 22, further comprising using the GPU to change the resource descriptor.

26. A non-transitory computer readable medium having embodied therein computer readable instructions configured to implement a computer graphics method in a system having a central processing unit (CPU) and a graphics processing unit (GPU) having one or more registers, the method comprising:

using the GPU to create a resource descriptor stored in one or more of the GPU's registers, wherein the resource descriptor describes a shader resource that is used during a draw call of the GPU and wherein the result of the draw call is displayed on a display device.

* * * * *